United States Patent [19]

Kobayashi et al.

[11] Patent Number: 4,680,345

[45] Date of Patent: Jul. 14, 1987

[54] CONTINUOUS PRODUCTION OF ELASTIC POLYESTERS

[75] Inventors: Takuma Kobayashi, Otsu; Hironobu Kitagawa, Shiga; Noritsugu Kaneshige, Hirakata; Osamu Makimura, Ogaki, all of Japan

[73] Assignee: Toyo Boseki Kabushiki Kaisha, Osaka, Japan

[21] Appl. No.: 867,646

[22] Filed: May 28, 1986

[30] Foreign Application Priority Data

Jun. 5, 1985 [JP] Japan ............................. 60-122294
Jul. 30, 1985 [JP] Japan ............................. 60-169175

[51] Int. Cl.$^4$ ............................................. C08G 63/76
[52] U.S. Cl. ..................................... 525/437; 528/491
[58] Field of Search .......................... 525/437; 528/491

[56] References Cited

U.S. PATENT DOCUMENTS

| | | | |
|---|---|---|---|
| 2,758,915 | 8/1956 | Vodonik et al. | 422/137 |
| 3,502,623 | 3/1970 | Hurworth et al. | 528/354 |
| 4,096,125 | 6/1978 | Smith et al. | 525/437 X |
| 4,569,973 | 2/1986 | Tyrell et al. | 525/437 |

FOREIGN PATENT DOCUMENTS

| | | |
|---|---|---|
| 0089643 | 9/1983 | European Pat. Off. . |
| 1523057 | 4/1968 | France . |
| 2353585 | 12/1977 | France . |
| 1533817 | 11/1978 | United Kingdom . |

OTHER PUBLICATIONS

Sumoto, M., et al., Chemical Abstracts 80:16127j (1974).

Primary Examiner—Lucille M. Phynes

[57] ABSTRACT

An improvement in a process for producing an elastic polyester wherein a crystalline aromatic polyester and one or plurality of lactones are reacted, the improvement comprises by carrying out the reaction in a continuous process by continuously feeding the molten crystalline aromatic polyester and the lactones to a reaction vessel to subject them to addition polymerization, while continuously discharging a reaction mixture from the vessel to obtain the elastic polyester. Optionally, the reaction mixture can be further subjected to polycondensation in a molten state or a solid phase.

14 Claims, 7 Drawing Figures

CONTINUOUS PRODUCTION OF ELASTIC POLYESTERS

FIELD OF THE INVENTION

The present invention relates to continuous production of elastic polyesters comprising as main components crystalline aromatic polyesters and lactones, wherein the hard segments thereof are composed of the crystalline aromatic polyesters and the soft segments thereof are composed of polylactones. More specifically, it relates to a continuous and economical process for producing elastic polyesters having excellent color tone and excellent properties.

BACKGROUND OF THE INVENTION

Elastic polyesters which are used for fibers, molding materials and films have been hitherto produced by batch processes as disclosed in, for example, Japanese Patent Publication Nos. 4116/1973 and 49037/1977 by melting a mixture of crystalline polyester chips and lactones with heating and reacting them in a batch-wise operation.

However, in batch processes, there is a drawback such as polymers having stable color tone can be hardly obtained. Further, it is difficult to remove unreacted lactones in batch processes, which produces bad smell in resulting polymers. In addition, batch processes have many disadvantages from economical viewpoint.

Under these circumstances, the present inventors have intensively studied to eliminate the above drawbacks of conventional batch processes and to find out most advantageous process and operating conditions. As the result, it has been found that it is possible to carry out the production of elastic polyesters by a continuous process without the above drawbacks. Further, it has been found that it is possible to reduce a content of terminal carboxyl group in a resulting polymer by the continuous process, which improves color tone of the resulting polymer.

OBJECTS OF THE INVENTION

One object of the present invention is to provide an improvement in a process for producing elastic polyesters by reaction of crystalline aromatic polyesters and lactones.

Another object of the present invention is to provide a continuous process for producing elastic polyesters.

Another object of the present invention is to provide a process which can produce elastic polyesters having stable color tone economically.

Still another object of the present invention is to provide a reaction vessel suitable for the continuous production of elastic polyesters.

These objects as well as other objects and advantages of the present invention will become apparent to those skilled in the art from the following description by making reference to the attached drawings.

SUMMARY OF THE INVENTION

Figure 1:
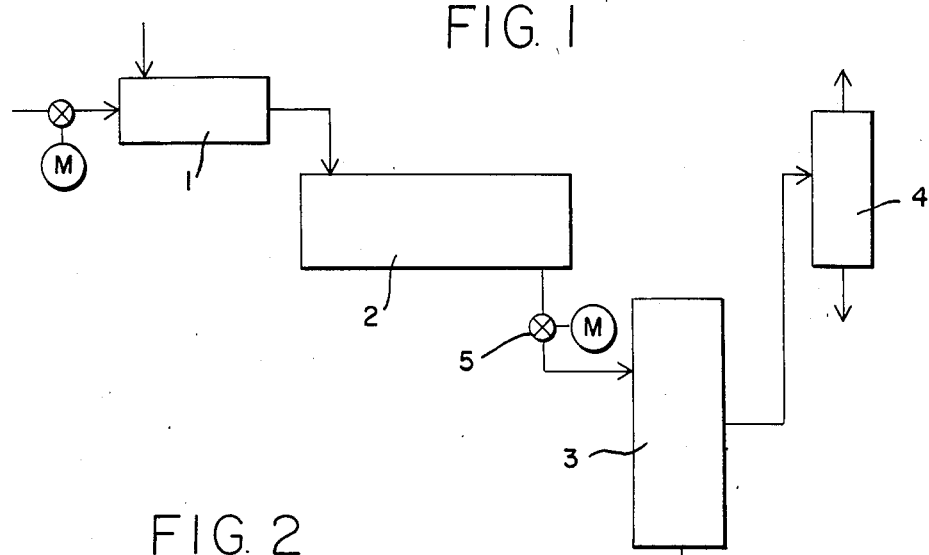
FIG. 1 is a flow sheet illustrating an embodiment of the continuous process of the present invention.

According to the present invention, there is provided an improvement in a process for producing an elastic polyester wherein a crystalline aromatic polyester and one or plurality of lactones are reacted, the improvement comprises carrying out the reaction in a continuous process by continuously feeding the molten crystalline aromatic polyester and the lactones to a reaction vessel to subject them to addition polymerization, while continuously discharging a reaction mixture from the vessel to obtain the elastic polyester. Optionally, the reaction mixture can be further subjected to polycondensation in a molten state or a solid phase.

DETAILED EXPLANATION OF THE INVENTION

The crystalline aromatic polyester used in the present invention is a polymer mainly composed of ester bonds, or ester and ether bonds, and has at least one aromatic group in a main repeating unit and hydroxy group at the end of the molecule. For a molding material, the polyester having a molecular weight of not less than 5,000 is preferred but, for a coating, the polyester having a molecular weight of less than 5,000 is also preferred. Suitable examples of the polyester include homopolyesters such as polytetramethylene terephthalate, polyethylene terephthalate, poly-1,4-cyclohexylene dimethylene terephthalate and polyethylene 2,6-naphthalate, preferably, polytetramethylene terephthalate and polyethylene terephthalate; copolymerized polyesters or polyester-ethers such as those mainly composed of tetramethylene terephthalate unit or ethylene terephthalate unit and copolymerized with other copolymerizable components such as tetramethylene isophthalate unite, ethylene isophthalate unit, tetramethylene adipate unit, tetramethylene sebacate unit, ethylene sebacate unit, 1,4-cyclohexylene dimethylene terephthalate unit, tetramentylene-p-oxybenzoate unit and ethylene-p-oxybenzoate unit.

The crystalline aromatic polyester can be produced by a conventional method.

As the lactone, $\epsilon$-caprolactone is most preferred but, other lactones such as enantholactone and caprylolactone can be also used. These lactones can be used alone or in combination thereof.

In view of elastic properties of the polymer to be obtained, the composition ratio of the crystalline aromatic polyester and the lactone (weight ration of crystalline aromatic polyester/lactone) is preferably 98/2 to 20/80, more preferably, 96/4 to 30/70.

In the present invention, the elastic polyester can be obtained without or with using a catalyst. Any catalyst which is generally known to be used as a polymerization catalyst for lactones can be used. Suitable examples of the catalyst include metals such as lithium, sodium, potassium, cesium, magnesium, calcium, barium, strontium, zinc, aluminum, titanium, cobalt, germanium, tin, lead, antimony, arsenic, cerium, boron, cadmium, and manganese; and organic metal compounds, organic acid salts and alkoxides thereof. Particularly preferred catalysts are organic tin, organic aluminum and organic titanium compounds, for example, stannous diacyl, stannic tetraacyl, dibutyltin oxide, dibutyltin dilaurate, tin dioctanoate, tin tetraacetate, triisobutyl aluminum, tetrabutyl titanate, germanium dioxide and antimony trioxide. These catalysts can be used alone or in combination thereof.

Generally, these catalysts are also known to be used as polymerization catalysts for aromatic polyesters. Accordingly, the catalyst can be added to a reaction system when polymerization of the aromatic polyester is conducted, or a part of the catalyst can be added to a reaction system when polymerization of the aromatic polyester is conducted and then the remainder can be added when addition polymerization with the lactone is conducted. The catalyst can be used in an amount of not more than 0.2% by weight, preferably, 0.001 to 0.1% by weight based on the total amount of the aromatic polyester and the lactone.

The continuous process of the present invention is carried out by continuously feeding the crystalline aromatic polyester and the lactone to a reaction vessel.

For example, the crystalline aromatic polyester can be directly and continuously fed to a reaction vessel in a molten state after the polymerization reaction in the production of the polyester itself. Alternatively, the crystalline aromatic polyester can be molded into chips after the polymerization reaction in the production of the polyester itself and then they can be molten to continuously feed to a reaction vessel. The crystalline aromatic polyester and the lactone can be fed to a reaction vessel as a mixture thereof. For example, after addition of the lactone to the polyester chips, the mixture can be molten and continuously fed to a reaction vessel, or after mixing the molten polyester with the lactone, the mixture can be continuously fed to a reaction vessel.

The reaction vessel is not limited to a specific one but it is preferable to use the reaction vessel such as that shown in FIGS. 2 to 5.

By the way, additives such as an antioxidant can be added in the preparation of a mixture of the crystalline aromatic polyester and the lactone.

Then, the crystalline aromatic polyester and the lactone is subjected to addition polymerization in the reaction vessel at such a temperature that a mixture of the aromatic polyester and the lactone is homogeneously molten, and not lower than the melting point of the elastic polyester produced. The reaction mixture is continuously discharged from the reaction vessel according to a known manner and, optionally, subjecting to a standard purification to obtain the desired elastic polyester. Optionally, after discharging the reaction mixture from the reaction vessel, it can be further subjected to polycondensation in a molten state or a solid phase according to a conventional manner to increase viscosity of the elastic polyester produced or to decrease a content of terminal carboxyl group thereof.

Preferred embodiments of the present invention are illustrated hereinafter with making reference to the drawings.

FIG. 1 is a flow sheet illustrating a preferred embodiment of the continuous process of the present invention. Firstly, the molten aromatic polyester is fed to a mixer 1 through a feeder which can feed the polyester quantitatively such as a gear pump (not shown). The lactone which is previously heated is also fed to the mixer 1 quantitatively and mixed with the molten aromatic polyester. The mixer is maintained at a temperature enough to prevent solidification of the polyester and the lactone. Then, the mixture is discharged from the mixer 1 and continuously fed to a reaction vessel 2. The mixture is held in the vessel 2 for a predetermined time to proceed addition polymerization and then discharged from the vessel through a discharge valve 5. When removal of unreacted monomers is required, the mixture is fed to a monomer separator 3. Unreacted monomers separated are discharged from the separator through a condenser 4, while the polymerized desired elastic polyester is discharged from the separator through a discharge valve 6.

Although the lactone can be fed as it is, it is preferable that the lactone is previously heated to about 100° to 230° C., particularly, 150° to 210° C. The addition polymerization of the molten crystalline aromatic polyester and the lactone can be carried out by holding the mixture in the reaction vessel at 210° to 260° C., preferably, 215° to 245° C. for 30 minutes to 6 hours, preferably, 1 to 3 hours on the average at atmospheric pressure or under pressure. Further, the removal of unreacted monomers is preferably carried out by holding the mixture in the separator at a temperature not less than its melting point for 1 to 30 minutes on the average under reduced pressure of not higher than 50 Torr.

Figure 2:
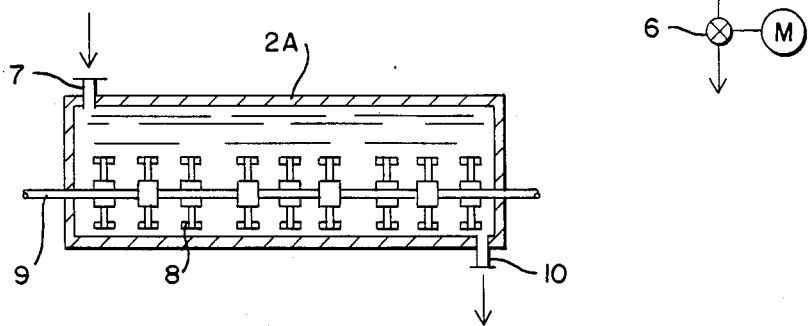
FIG. 2 is a schematic side sectional view taken along the axial direction of an embodiment of a horizontally arranged reaction vessel used in the continuous process of the present invention.

FIG. 2 is a schematic side sectional view taken along the axial direction of an embodiment of a horizontally arranged reaction vessel used in the continuous process of the present invention. This reaction vessel 2A has an entrance 7 at the upper part of the one end of the vessel and an outlet 10 at the lower part of the other end of the vessel. The vessel contains agitating blades 8 attached to horizontally extending shaft 9 which is rotated by a driving means (not shown). The mixture of the crystalline aromatic polyester and the lactone is fed from the entrance 7 into the reaction vessel 2A and moved toward the outlet 10. During this time, the additjion polymerization is carried out. Then, the mixture is discharged from the vessel 2A through the outlet 10.

When a horizontally arranged reaction vessel such as that shown in FIG. 2 is used, a gaseous phase is liable to be present at the upper part of the vessel and a part of the unreacted lactone fed from the entrance of the vessel is liable to pass into the gaseous phase, to move toward the outlet end of the vessel through the gaseous phase and to contaminate the resulting elastic polyester product at the outlet end of the vessel. This results in the problem such as lack of constancy in quality of the elastic polyester product as well as lack of constancy of consumption of the lactone.

In order to prevent this problem, it is preferable to fed the mixture of the crystalline aromatic polyester and the lactone to the vessel in such a manner that it fills the entire space in the vessel 2A so that no gaseous phase is present as shown in FIG. 2. Alternatively, a vertically arranged reaction vessel can be employed.

Figure 3:
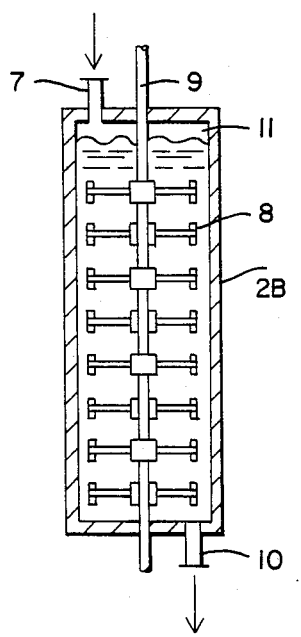
FIG. 3 is a schematic side sectional view taken along the axial direction of an embodiment of a vertically arranged reaction vessel used in the continuous process of the present invention.

FIG. 3 is a schematic side sectional view taken along the axial direction of an embodiment of a vertically arranged reaction vessel. Likewise, the reaction vessel 2B has an entrance 7 at the upper part of the one end of the vessel and an outlet 10 at the lower part of the other end of the vessel. However, the vessel 2B is vertically arranged and contains agitating blades 8 attached to vertically extending shaft 9 which is rotated by a driving means (not shown). The mixture of the crystalline aromatic polyester and the lactone is fed from the entrance 7 into the reaction vessel 2B and moved toward the outlet 10. During this time, the addition polymerization is carried out. Then, the mixture is discharged from the vessel 2B through the outlet 10. Although a gaseous phase 11 is present at the upper end of the vessel, the gaseous phase is isolated from the outlet end to prevent the above problem. In this reaction vessel, the mixture of the polyester and the lactone can be fed in the opposite way, i.e., from the outlet 10 to the entrance 7.

By the way, so long as the gaseous phase is isolated from the outlet end, the above problem can be prevented. Accordingly, the vertical arrangement as shown in FIG. 3 is not necessarily required and, when the reaction vessel is arranged so that the vessel has an inclination angle to the horizontal axis of, for example, 5° to 90°, preferably, 45° to 90°, the isolation of the gaseous phase from the outlet end can be attained to prevent the problem. Further, a horizontally arranged reaction vessel having a means for preventing movement of the unreacted lactone toward the outlet end through a gaseous phase can be used to prevent the problem. One embodiment of such a reaction vessel is shown in FIGS. 4 and 5.

Figure 4:
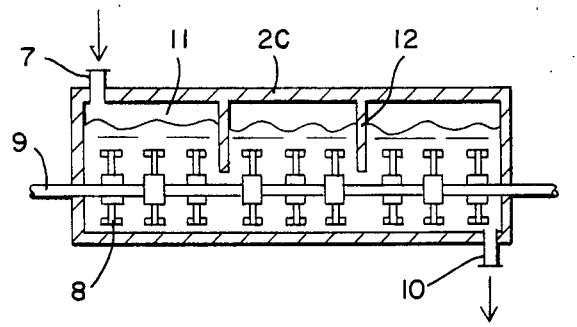
FIG. 4 is a schematic side sectional view taken along the axial direction of a still another embodiment of a horizontally arranged reaction vessel used in the continuous process of the present invention.
Figure 5:
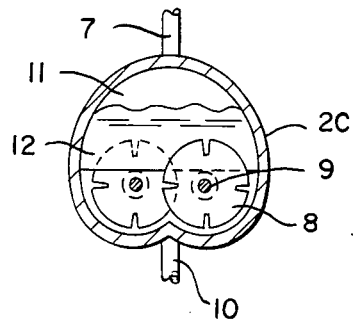
FIG. 5 is a schematic cross sectional view of the reaction vessel shown in FIG. 4.

FIG. 4 is a schematic side sectional view taken along the axial direction of the horizontally arranged reaction vessel and FIG. 5 is a schematic cross sectional view of the reaction vessel shown in FIG. 4. This reaction vessel 2C has a similar horizontal arrangement to that shown in FIG. 2, but two baffle plates 12f are provided to the upper part of the inner space of the vessel as a means for preventing movement of the unreacted lactone through a gaseous phase present. As is seen from FIG. 5, the vessel 2C has a heart-shaped cross section and contains two sets of agitating blades which attached to horizontal shafts arranged in parallel. The mixture of the crystalline aromatic polyester and the lactone is fed to the vessel through the entrance 7 and discharged through the outlet 10. Even if a gaseous phase 11 is present, the movement of unreacted lactone passed into the gaseous phase toward the outlet end is prevented by the baffle plates. The shape and the number of the baffle plate are not limited but the plate should have an enough length to vertically divide a gaseous phase into at least two sections and one end thereof should be dipped in the reaction mixture. The number of the agitating blades and the rotating shaft as well as the shape of cross section of the reaction vessel are not limited, either. In addition to the heart-shaped cross section, the vessel may have a circular, ellipsoidal, cocoon-like shaped cross section. The cocoon-like shaped cross section is preferred because formation of a gaseous phase is minimized.

As mentioned above, the reaction mixture from the reaction vessel can be further subjected to polycondensation in a molten state or a solid phase to increase viscosity of the elastic polyester produced or to decrease a content of terminal carboxyl group thereof.

Figure 6:
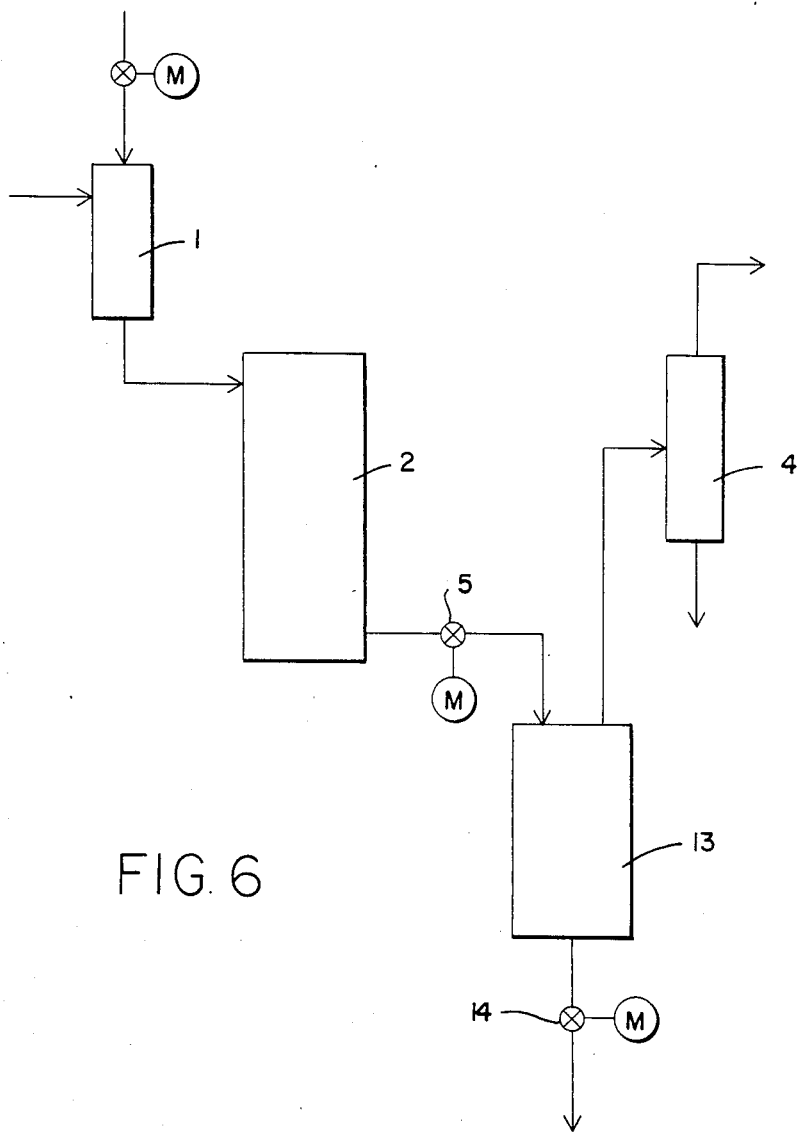
FIG. 6 is a flow sheet illustrating another embodiment of the continuous process of the present invention.

FIG. 6 is a flow sheet illustrating an embodiment of the continuous process of the present invention including polycondensation of the reaction mixture in a molten state.

In FIG. 6, the molten crystalline aromatic polyester and the lactone are mixed in a mixer 1 and fed to a reaction vessel 2 to subject to addition polymerization as mentioned above. Then, the reaction mixture in a molten state is discharged from the vessel through a discharge valve 5 and fed as such to a polycondensation reactor 13.

Unreacted monomers are separated and discharged through a condenser 4, and the polymerized product is discharged from the reactor 13 through a discharge valve 14. The polycondensation is preferably carried out at 240° C. or lower under reduced pressure of about 50 Torr or lower by holding the reaction mixture in the reactor 13 at such a temperature that solidification of the reaction mixture which is fed from the reaction vessel 2 is prevented. The average holding time in the reactor is 30 minutes to 10 hours, preferably, 1 to 6 hours.

Figure 7:
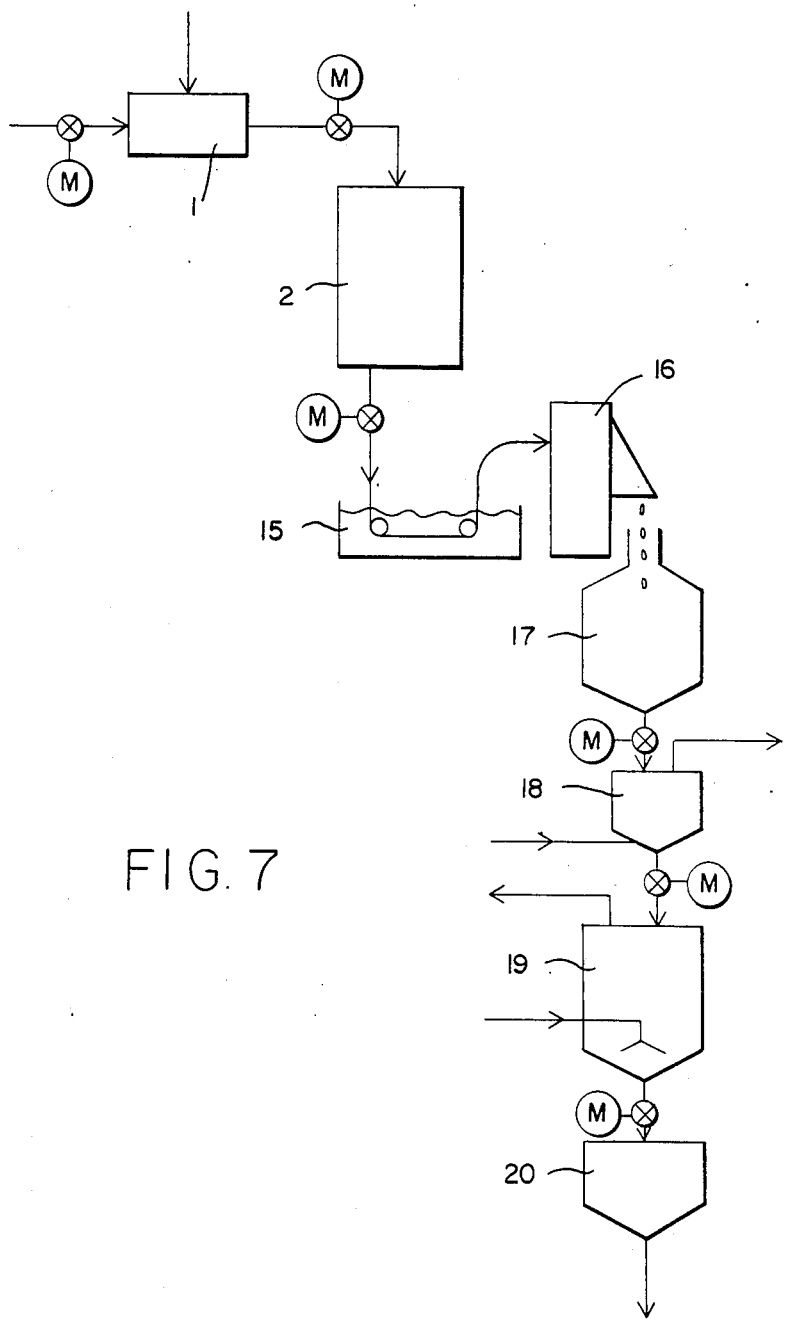
FIG. 7 is a schematic flow sheet illustrating still another embodiment of the continuous process of the present invention.

FIG. 7 is a schematic flow sheet illustrating an embodiment of the continuous process of the present invention including polycondensation of the reaction mixture in a solid phase.

In FIG. 7, the molten crystalline aromatic polyester and the lactone are mixed in a mixer 1 and fed to a reaction vessel 2 to subject to addition polymerization. After the reaction mixture is discharged from the vessel 2, it is cooled in a cooling tank 15 and fed to a pelletizer 16 to be molded into chips. The resulting chips are stored in a chip hopper 17, or without storage, they are directly fed to a preheating drier 18. In the preheating drier, gas heated to 80° to 190° C. is introduced from the lower opening and the elastic polyester chips are dried until the water content thereof becomes 0.01% by weight or lower. The dried chips are fed to a solid phase polycondensation reactor 19 in a continuous or batchwise operation. The chips fed in the reactor 19 is subjected to polycondensation by introducing gas heated to 170° to 250° C. into the reactor from the lower opening thereof, discharged from the reactor 19 and stored in a storage hopper 20. the polycondensation is preferably carried out by holding the chips in the reactor 19 at a temperature of not higher than 240° C., preferably, 170° to 215° C. for 30 minutes to 24 hours, preferably, 1 to 6 hours on the average.

The following Examples, Comparative Examples and Reference Examples further illustrate the present invention in detail but are not to be construed to limit the scope thereof. All the "parts" are by weight unless otherwise stated.

In Examples, Comparative Examples and Reference Examples, the reduced specific viscosity, the amount of terminal carboxyl group, color tone, the content of unreacted lactone monomer and the amount of black carbide particles were measured as follows.

Reduced specific viscosity (RSV)

The reduced specific viscosity was measured at 30° C. at the concentration of 50 mg/25 ml in phenol/TCE (6/4, w/w).

Amount of terminal carboxyl group

The elastic polyester product (100 mg) and benzyl alcohol (10 ml) were placed in a vessel and they were dissolved with stirring at 200° C. The stirring was continued for 2, 4 or 6 minutes. After stirring, the mixture was cooled with water and diluted with chloroform (10 ml). For each stirring time, the resulting solution was titrated with 0.1N sodium hydroxide in benzyl alcohol by using phenolphthalein as an indicator to determine the content of carboxyl group in the solution. The results obtained were extrapolated to the stirring time of 0 minute. This value was deemed to be the amount of terminal carboxyl group.

Color tone

The color tone was measured by using a differential colorimeter manufactured by Nippon Denshoku Kogyo K.K. in Japan.

Content of unreacted lactone monomer

The elastic polyester chips (5 g) and carbon tetrachloride (150 ml) were placed in an Erlenmeyer flask equipped with a condenser. Boiling stones were added thereto and the mixture was heated under reflux for 3 hours to extract the unreacted lactone monomer in the chips. The carbon tetrachloride solution was separated and the amount of the unreacted lactone monomer in the solution was measured by using GC-7A Model Gas Chromatograph manufactured by Shimazu Seisaku-sho in Japan. The amount was converted to the content of unreacted lactone monomer in the chips.

Amount of black carbide particles

The elastic polyester chips (250 g) was taken and the number of black carbide particles having diameter larger than 100μ was counted with the naked eye.

EXAMPLE 1

Polytetramethylene terephthalate chips (RSV: 1.130) was molten with an extruder. A mixture of the molten polytetramethylene terephthalate (70 parts), ε-caprolactone (30 parts) and Ionox 330 (antioxidant manufactured by Shell Chem. in U.S.A.) (0.2 part) was directly and continuously fed to the reaction vessel as shown in FIG. 3 and subjected to addition polymerization by holding the mixture in the vessel at 230° C. for 120 minutes on the average to obtain a desired elastic polyester.

EXAMPLE 2

A slurry of terephthalic acid (100 parts), tetramethylene glycol (82 parts) and tetrabutyl titanate (0.1 part) was continuously fed to an esterification reactor to subject it to esterification reaction and then the reaction mixture was subjected to prepolymerization in another reactor to obtain a prepolymer. The prepolymer was cfed to a polymerization reactor to subject it to polymerization at 245° C. under pressure of 0.5 mmHg to obtain polytetramethylene terephthalate having RSV of 1.06. This polymer was directly fed to a kneader. In the kneader, the polytetramethylene terrephthalate (70 parts), ε-caprolactone (30 parts) and Ionox 330 (0.2 part) were mixed and the mixture was continuously fed to a reaction vessel as shown in FIG. 3. According to the same procedure as in Example 1, the mixture was subjected to addition polymerization to obtain a desired elastic polyester.

EXAMPLE 3

The same procedure as in Example 1 was repeated except that polytetramethylene terephthalate chips as used in Example 1 (85 parts), ε-caprolactone (15 parts) and Ionox 330 (0.2 part) were placed in a kneader. After mixing, they were molten and the continuously fed to the reaction vessel.

EXAMPLE 4

According to the same procedure as in Example 1, addition polymerization was carried out and then the reaction mixture in a molten state was continuously fed to a thin film type monomer separator to remove unreacted ε-caprolactone under reduced pressure of 1 Torr.

Comparative Example 1

Polytetramethylene terephthalate chips (RSV: 1.130) (70 parts), ε-caprolactone (30 parts) and Ionox 330 (0.2 part) were charged in a batch-wise reaction vessel equipped with a stirrer. After the vessel was thoroughly purged with nitrogen gas, the mixture was heated to 230° C. with stirring and reacted at this temperature for 2 hours to obtain an elastic polyester.

Comparative Example 2

According to the same procedure as in Comparative Example 1, polytetramethylene terephthalate chips as used in Comparative Example 1 (85 parts), ε-caprolactone (15 parts) and Ionox 330 (0.2 part) were reacted to obtain an elastic polyester.

Comparative Example 3

Polytetramethylene terephthalate chips (RSV: 1.130) (70 parts) was charged in a batch-wise reaction vessel equipped with a stirrer and the vessel was thoroughly purged with nitrogen gas. The temperature was raised to 230° C. with stirring to melt polytetramethylene terephthalate chips. Under nitrogen atmosphere, ε-caprolactone (30 parts) and Ionox 330 (0.2 part) were charged in the vessel and they were reacted with stirring at 230° C. for 2 hours to obtain an elastic polyester.

Comparative Example 4

According to the the same procedure as in Comparative Example 3, a reaction was carried out and unreacted ε-caprolactone was removed under 1 Torr for 60 minutes to obtain an elastic polyester.

Reference Example 1

RSV, amount of terminal carboxyl group and color tone of each elastic polyester chips obtained in Examples 1 to 3 and Comparative Examples 1 to 3 were measured. The results are shown in Table 1.

TABLE 1

|  | RSV | Amount of terminal carboxyl group | Color tone L/b value |
| --- | --- | --- | --- |
| Example 1 | 1.174 | 61 | 77/10.9 |
| 2 | 1.130 | 59 | 73/8.9 |
| 3 | 1.070 | 72 | 76/9.3 |
| Compar. |  |  |  |
| Example 1 | 1.160 | 67 | 76/15.0 |
| 2 | 1.060 | 73 | 68/17.0 |
| 3 | 0.920 | 87 | 69/16.7 |

Reference Example 2

Amount of terminal carboxyl group and color tone of each elastic polyester chips obtained in Example 4 and Comparative Example 4 were measured. Further, presence of smell due to the remaining ε-caprolactone in the chips was also examined. The results are shown in Table 2.

TABLE 2

|  | Example 4 | Compar. Example 4 |
|---|---|---|
| RSV ($\eta$ sp/c) | 1.168 | 0.920 |
| Amount of terminal carboxyl group | 61 | 90 |
| Color tone (L/b value) | 74/10.7 | 67/17.0 |
| Smell due to the monomer | no smell | bad smell |
| Remaining $\epsilon$-caprolactone (ppm) | 470 | 1,000 |

As is seen from Tables 1 and 2, the amount of terminal carboxyl group of the elastic polyester obtained according to the process of the present invention is not more than 72 and it has not less than 70 of L value and not more than 11 of b value. Further, after removing the remaining monomer, the amfount of the remaining $\epsilon$-caprolactone in the elastic polyester obtained according to the process of the present invention is 470 ppm which is much lower than that obtained the batch process, i.e., 1,100 ppm.

EXAMPLES 5 AND 6

A mixture of molten polytetramethylene terephthalate chips (RSV: 1.130) (70 parts), $\epsilon$-caprolactone (30 parts) and Ionox 330 (0.2 part) was fed to a reaction vessel as shown in FIG. 2 so that the vessel was filled with the mixture. The mixture was held in the vessel at 230° C. for 90 minutes (Example 5) or 120 minutes (Example 6) on the average to subject to addition polymerization. RSV, amount of the unreacted monomer and content of carbide particles of the resulting elastic polyesters are shown in Table 3 hereinafter.

Comparative Examples 5 and 6

The same procedures as in Examples 5 and 6 were repeated except that a gaseous phase was present in the reaction vessel. Likewise, RSV, amount of the unreacted monomer and content of carbide particles of the resulting elastic polyesters are shown in Table 3.

TABLE 3

|  | Reaction time (min.) | RSV ($\eta$ sp/c) | Amount of unreacted lactone (ppm) | Carbide (particles/ 250 g) |
|---|---|---|---|---|
| Example 5 | 90 | 1.212 | 23,000 | 5 |
| 6 | 120 | 1.210 | 16,000 | 10 |
| Compar. Example 5 | 90 | 1.095 | 37,000 | 170 |
| 6 | 120 | 1.086 | 33,000 | 210 |

As is seen from Table 3, when a horizontally arranged reaction vessel containing a gaseous phase is used, viscosity of the resulting elastic polyester is decreased, and the amount of the unreacted lactone and content of carbide particles are increased.

EXAMPLES 7 TO 9

A mixture of molten polytetramethylene terephthalate chips (RSV: 1.130) (70 parts), $\epsilon$-caprolactone (30 parts), Ionox 330 (0.2 part) was continuously fed to a reaction vessel as shown in FIG. 3 so that the vessel was filled with the mixture. The mixture was held in the vessel as 230° C. for 90 minutes (Example 7), 120 minutes (Example 8) or 180 minutes (Example 9) on the average to subject to addition polymerization. RSV, amount of the unreacted lactone and content of carbide particles of the resulting elastic polyesters are shown in Table 4 hereinafter.

EXAMPLES 10 TO 12

The same procedures as in Examples 7 to 9 were repeated except that a gaseous phase was present in the vessel. Likewise, RSV, amount of the unreacted lactone and content of carbide particles of the resulting elastic polyesters are shown in Table 4.

TABLE 4

|  | Reaction time (min.) | RSV ($\epsilon$ sp/c) | Amount of unreacted lactone (ppm) | Carbide (particles/ 250 g) |
|---|---|---|---|---|
| Example 7 | 90 | 1.213 | 22,000 | 5 |
| 8 | 120 | 1.210 | 15,000 | 10 |
| 9 | 180 | 1.187 | 14,000 | 10 |
| 10 | 90 | 1.211 | 23,000 | 15 |
| 11 | 120 | 1.212 | 15,000 | 20 |
| 12 | 180 | 1.190 | 14,000 | 15 |

As is seen from Table 4, when a vertically arranged reaction vessel is used, even if a gaseous phase is present, the resulting product has higher viscosity, lower amount of terminal carboxyl group and lower content of carbide particles than those of Comparative Examples 5 and 6.

EXAMPLES 13 TO 15

A mixture of molten polytetramethylene terephthalate chips (RSV: 1.130) (70 parts), $\epsilon$-caprolactone (30 parts), Ionox 330 (0.2 part) was continuously fed to a reaction vessel as shown in FIGS. 4 and 5. The mixture was held in the vessel at 230° C. for 90 minutes (Example 13), 120 minutes (Example 14) or 180 minutes (Example 15) on the average to subject it to addition polymerization. RSV and amount of the unreacted lactone are shown in Table 5.

TABLE 5

|  | Reaction time (min.) | RSV ($\eta$ sp/c) | Amount of unreacted lactone (ppm) |
|---|---|---|---|
| Example 13 | 90 | 1.132 | 25,300 |
| 14 | 120 | 1.145 | 20.800 |
| 15 | 180 | 1.106 | 16,000 |

As is seen from Table 5, when a horizontally arranged reaction vessel having baffle plates in a gaseous phase, viscosity of the resulting elastic polyester is increased, and the amount of the unreacted lactone is decreased.

EXAMPLE 16

Polytetramethylene terephthalate chips (RSV: 1.130) was molten with an extruder. The molten polytetramethylene terephthalate (70 parts), $\epsilon$-caprolactone (30 parts) and ionox 330 (0.2 part) were mixed and fed to a reaction vessel as shown in FIG. 3. The mixture was held in the vessel at 230° C. for 120 minutes on the average to subject it to addition polymerization. RSV of the resulting elastic polyester was 1.172. Then, the polyester was continuously fed to a horizontally arranged polycondensation reactor and held in the reactor at 225° C. for about 120 minutes on the average under reduced pressure of 1 Torr to subject it to polycondensation reaction.

EXAMPLE 17

According to the same procedure in Example 16, a mixture of molten polytetramethylene terephthalate (RSV: 1.330) (57 parts), ε-caprolactone (43 parts) and Ionox 330 (0.2 part) was continuously fed to a reacting vessel as shown in FIG. 3 to subject to addition polymerization. RSV of the resulting elastic polyester was 1.330. Then, the polyester was continuously fed to a polycondensation reactor and held in the reactor at 225° C. for 120 minutes on the average under reduced pressure of 1 Torr to subject it to polycondensation reaction.

Comparative Example 7

Polytetramethylene terephthalate (RSV: 1.130) (70 parts), ε-caprolactone (30 parts) and Ionox 330 (0.2 part) were placed in a batch-wise reaction vessel equipped with a stirrer. After the vessel was thoroughly purged with nitrogen, the temperature was raised to 230° C. with stirring to melt the mixture and the mixture was subjected to addition polymerization at 230° C. for 120 minutes to obtain an elastic polyester having RSV of 1.160. The polyester was subjected to polycondensation at 230° C. for 120 minutes under reduced pressure of 1 Torr.

Reference Example 2

RSV, amount of terminal carboxyl group and color tone of each elastic polyester chips obtained in Examples 16 and 17 and Comparative Example 7 were measured. The results are shown in Table 6.

TABLE 6

|  | RSV | Amount of terminal carboxyl group | Color L/b value |
|---|---|---|---|
| Example 16 | 1.247 | 60.0 | 75.8/11.8 |
| 17 | 1.420 | 44.6 | 75.2/10.5 |
| Compar. Example 7 | 1.220 | 68.0 | 73.5/15.8 |

As is seen from Table 6, the elastic polyester obtained according to the process of the present invention has high RSV and the amount of carboxyl group thereof is not more than 60. It has L value of not less than 75 and b value of not more than 12. These properties are extremely superior to those of the product obtained by the batch process.

EXAMPLE 18

According to the same procedure as in Example 17, addition polymerization was carried out to obtain elastic polyester chips having RSV of 1.330. The chips were fed to a predrier and dried with hot air at 130° C. for 2 hours and then fed to a solid phase polymerization reactor. Under nitrogen atmosphere, polymerization was carried out in a solid phase at 200° C. for 4 hours.

EXAMPLE 19

The same procedure as in Example 18 was repeated except that polymerization in a solid phase was carried out at 180° C.

EXAMPLE 20

According to the same procedure as in Example 16, an elastic polyester having RSV of 1.174 was prepared. According to the same procedure as in Example 18, the polyester chips were fed to a predrier and dried at 130° C. for 2 hours. Then, under nitrogen atmosphere, polymerization in a solid phase was carried out at 200° C. for 4 hours.

Comparative Example 8

According to the same procedure as in Comparative Example 7, an elastic polyester having RSV of 1.160 was prepared in a batch process. After the polyester was molded in chips, the chips were dried with hot air at 130° C. for 2 hours. Then, under nitrogen atmosphere, polymerization in a solid phase was carried out at 200° C. for 4 hours.

Reference Example 3

RSV, amount of terminal carboxyl group and color tone of each elastic polyester chips of Examples 18 to 20 and Comparative Examples 8 are shown in Table 7.

TABLE 7

|  | RSV | Amount of terminal carboxyl group | Color L/b value |
|---|---|---|---|
| Example 18 | 1.690 | 40.4 | 78.0/9.8 |
| 19 | 1.417 | 44.3 | 76.8/10.9 |
| 20 | 1.345 | 59.8 | 78.0/10.2 |
| Compar. Example 8 | 1.322 | 63.3 | 72.8/16.5 |

As is seen from Table 7, the elastic polyester obtained according to the process of the present invention has high RSV and the amount of carboxyl group thereof is not more than 60. It has L value of not less than 75 and b value of not more than 11. These properties are extremely superior to those of the product obtained by the batch process.

According to the process of the present invention, the production of elastic polyesters can be continuously carried out with very easy operation and time required for addition polymerization and polycondensation is remarkably reduced. Further, elastic polyesters having good color tone and being free from monomer odor can be obtained. In addition, since the resulting elastic polyester products have excellent rubber elasticity, flexibility, light-resistance and heat resistance, they are useful for shock-resistant molding materials and fibers and, by admixing with other resins, they are also useful for impact modifiers, plasticizers and the like. Furthermore, the elastic polyesters can be applied in much wider use by combining them with various additives such as UV absorbers, heat stabilizers, lubricants, pigments and releasing agents.

What is claimed is:

1. A process for producing an elastic polyester wherein a crystalline aromatic polyester and one or plurality of lactones are reacted, said process comprises by carrying out the reaction in a continuous process by continuously feeding the molten crystalline aromatic polyester and the lactones to a reaction vessel to subject them to addition polymerization.

2. A process according to claim 1, wherein, after addition polymerization, the resulting elastic polyester is further continuously subjected to removal of unreacted monomers.

3. A process according to claim 1, wherein the reaction vessel is a horizontally arranged reaction vessel and the molten crystalline aromatic polyester and the lactones are fed to the vessel so that the vessel is filled with them.

4. A process according to claim 1, wherein the reaction vessel is arranged so that it has an inclination angle of 5° to 90° to the horizontal axis.

5. A process according to claim 1, wherein the crystalline aromatic polyester is directly fed to the reaction vessel in a molten state after polymerization thereof.

6. A process according to claim 1, wherein the crystalline aromatic polyester is molded in chips after polymerization thereof and then chips are molten and fed to the reaction vessel.

7. A process according to claim 1, wherein the crystalline aromatic polyester chips are mixed with the lactones prior to melting and then the mixture was molten and fed to the reaction vessel.

8. A process according to claim 1, wherein the crystalline aromatic polyester chips are molten and then the molten chips are mixed with the lactones and fed to the reaction vessel.

9. A process according to claim 1, wherein addition polymerization is carried out by holding the reaction mixture in the vessel at 210° to 260° C. for 30 minutes to 6 hours on the average.

10. A process according to claim 2, the removal of unreacted monomer is carried out at a temperature not less than the melting point of the resulting polyester for 1 to 30 minutes on the average under reduced pressure of not higher than 50 Torr.

11. A process according to claim 1, wherein, after addition polymerization, the reaction mixture is further subjected to polycondensation in a molten state.

12. A process according to claim 11, wherein polycondensation is carried out at not higher than 240° C. under reduced pressure.

13. A process according to claim 1, wherein, after addition polymerization, the reaction mixture is further subjected to polycondensation in a solid phase.

14. A process according to claim 13, wherein polycondensation is carried out at not higher than 240° C.

* * * * *

UNITED STATES PATENT AND TRADEMARK OFFICE
CERTIFICATE OF CORRECTION

PATENT NO. : 4,680,345

DATED : July 14, 1987

INVENTOR(S) : Takuma Kobayashi et al

It is certified that error appears in the above-identified patent and that said Letters Patent is hereby corrected as shown below:

```
Claim 1 (column 12, line 56), change "by carrying" to
    --carrying--.
Claim 10 (column 14, line 3), after "claim 2," insert
    --wherein--.
```

Signed and Sealed this

Third Day of November, 1987

Attest:

Attesting Officer

DONALD J. QUIGG

Commissioner of Patents and Trademarks